United States Patent Office 2,795,583
Patented June 11, 1957

2,795,583
PHTHALOCYANINE DERIVATIVES

Tellis A. Martin and David I. Randall, Easton, Pa., assignors to General Aniline & Film Corporation, New York, N. Y., a corporation of Delaware No Drawing. Application July 14, 1953,
Serial No. 367,986

10 Claims. (Cl. 260—314.5)

This invention relates to novel compounds of the phthalocyanine series.

The compounds of this invention are novel phthalocyanine derivatives which may be described as phthalocyanines containing at least one methylene-2,4-dihydroxy-5-carboxybenzene redical nuclearly attached through the methylene groups to an aryl radical therein, i. e., (1) to a phenylene nucleus of the fundamental phthalocyanine nucleus or (2) to a pendant aryl nucleus attached directly or through a bridging link to a phenylene nucleus of the fundamental phthalocyanine nucleus. Such compounds have the following formula:

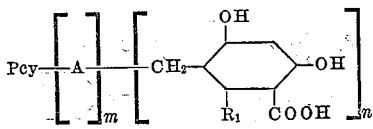

in which Pcy represents a fundamental phthalocyanine nucleus, A is a group of the formula:

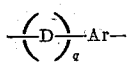

D is a divalent bridging link, q has a value of 0 or 1, Ar represents a pendant aryl nucleus comprising no more than 10 cyclic carbon atoms, m has a value of 0 to 8, $R_1$ is selected from the group consisting of hydrogen and inert substituents such as lower alkyl, lower alkoxy and the like, and n has a value of at least one.

The compounds of this invention may be produced by reacting a phthalocyanine compound containing at least one chloromethyl group with a β-resorcylic acid compound of the formula:

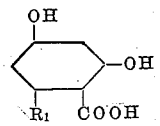

in which $R_1$ has the values given above. Compounds corresponding to the latter formula are β-resorcylic acid and its indicated methyl, ethyl, methoxy and/or ethoxy substituted derivatives, and the like.

The reaction involved in the process according to the instant invention may be depicted as follows:

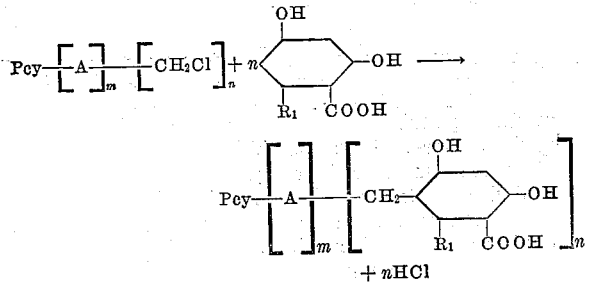

in which the various characters have the values given above.

The phthalocyanine nucleus (Pcy) in the above formula may be derived from a metal free phthalocyanine or from a metallic phthalocyanine such as copper phthalocyanine, zinc phthalocyanine, aluminum phthalocyanine, tin phthalocyanine, manganese phthalocyanine, nickel phthalocyanine, iron phthalocyanine and the like.

Examples of monoatomic or diatomic bridging links (D) in the above formula by which the pendant aryl nucleus (Ar) in the formula may be attached to the phthalocyanine nucleus are —S—, —O—, —CO—, —SO$_2$—, —CH$_2$S—, —CH$_2$SO$_2$—, —CH$_2$O—, —CH$_2$CO—, —SO$_2$CH$_2$—, —SO$_2$NR—, —NRCO—, —NRSO$_2$—, —SO$_2$O—, and the like, wherein R stands for hydrogen or a hydrocarbon radical such as methyl, ethyl and the like. The pendant aryl nucleus (Ar) may be benzene or naphthalene, unsubstituted or substituted by lower alkyl radicals such as methyl and/or ethyl. Phthalocyanine derivatives containing such pendant aryl nuclei and their methods of manufacture are per se known and no claims thereto are made herein.

The phthalocyanine precursors of the compounds of the instant invention, unsubstituted or substituted by pendant aryl nuclei, may be chloromethylated in known manner, as for example according to the procedures disclosed in U. S. Patents 2,435,307, 2,542,327 and 2,542,328, for example by condensation of the phthalocyanine at elevated temperatures in the presence of aluminum chloride and preferably of a tertiary amine not susceptible to chloromethylation, with symmetrical bichloromethyl ether or a reactant such as paraformaldehyde which reacts like bischloromethyl ether in the presence of aluminum chloride. Or the phthalocyanine precursor may be chloromethylated by reaction with bischloromethyl ether in the presence of sulfuric acid or methyl hydrogen sulfate, or in other known manner.

Representative of chloromethylated unsubstituted phthalocyanine compounds useful as starting materials in the production of the compounds of the instant invention are metal- and metal-free mono-, di-, tri-, tetra-, penta-, hexa-, hepta-, and octa- (chloromethyl)-phthalocyanines. In these compounds no more than two chloromethyl groups are nuclearly attached to any one phenylene nucleus of the fundamental phthalocyanine nucleus.

Where the phthalocyanine starting material contains one or more pendant aryl nuclei attached directly or through a linking atom or group of atoms to a phenylene nucleus of the fundamental phthalocyanine nucleus, the chloromethylation step introduces chloromethyl groups into the aryl residues of the pendant aryl nuclei. In general, no more than two pendant aryl nuclei may be introduced into any one of the four phenylene nuclei of the fundamental phthalocyanine nucleus, for a maximum of 8 pendant aryl nuclei (m in the above formula), and no more than two chloromethyl groups may be introduced into any one of the pendant aryl nuclei, for a maximum of 16 chloromethyl groups (n in the above formula).

In the process of the instant invention in which the chloromethylated phthalocyanine starting material is reacted with the β-resorcylic acid compound, a condensation takes place between the reactants involving liberation of hydrogen chloride. The reaction may be carried out by the application of heat with or without the assistance of a catalytic substance. In general, the reaction may be carried out at temperatures ranging from about 100 to 170° C. Theoretically, the β-resorcylic acid compound should be employed in an amount at least equivalent to the chlorine contained in the chloromethyl groups of the phthalocyanine compound. However, the reaction may be carried out in the presence of an excess of the β-resorcylic acid compound, which thus acts as both a reactant and a solvent or diluent. The use of a catalyst enables the reaction to proceed at somewhat lower temperatures within the aforementioned range. In general, suitable catalysts are metallic halides such as stannic chloride, ferric chloride, aluminum chloride, zinc chloride, mercuric chloride, and the like. Where a catalyst is employed, the reaction is preferably carried out in the presence of an inert reaction medium such as naphthalene, nitrobenzene, dichlorobenzene, and the like, in which case only a slight excess of the β-resorcyclic acid compound over that theoretically required need be employed. The reaction may also be carried out in a fused melt medium, as for example, molten sodium chloride and the like.

The duration of the reaction is of course variable depending upon the temperature employed, reactants involved, and the like, completion of the reaction being indicated by cessation of the evolution of hydrogen chloride. The resulting product may be separated from the reaction mixture by pouring into water and filtering and purifying the precipitated product of the invention. When the reaction is carried out in a hot melt such as fused salts, the mass may be allowed to cool and harden after completion of the reaction, and the mass then pulverized and treated with an acidic aqueous solution to dissolve out impurities. In some cases excess β-resorcylic acid compound may, after completion of the reaction, be removed by extraction or steam distillation.

The products of this invention have highly desirable properties. They possess excellent light fastness and are useful for coloring urea formaldehyde resins, nitrocellulose lacquers, spirit varnishes and the like. They exhibit excellent solubility properties in dilute alkali which, when coupled with the improved lightfastness, render them useful as colors in alkali soluble inks and the like. The fact that they are insoluble in hydrocarbon solvents but soluble in spirit solvents renders them of value as dyestuffs for certain fabrics which are subjected to dry cleaning fluids. The products range in color from greenish-blue to greenish-yellow. Those products of the invention are particularly effective which contain at least 4 pendant aryl nuclei joined to the phenylene nuclei of the fundamental phthalocyanine nucleus through a bridging link and from 1.5 to 2 methylene-2,4-dihydroxy-5-carboxybenzene radicals nuclearly attached to each of the pendant aryl nuclei ($q=1$, $m=4$ to 8, and $n=6$ to 16 in the above formula). These preferred products have highly desirable spirit- and alkali-solubility characteristics. It will of course be understood that the products of this invention may also be employed as intermediates in the manufacture of other derivatives. For example, the ortho-hydroxy-carboxy structure of the products renders them highly suitable in the preparation of lakes.

Reference is herewith made to U. S. Patents 2,430,052, 2,435,307, 2,456,274, 2,479,491, 2,542,327, 2,542,328, 2,124,299 and British Patents 589,118 and 565,200 for disclosures of phthalocyanine starting compounds useful in the process of this invention, including those containing pendant aryl nuclei attached directly or through a linking atom or group of atom to phenylene nuclei of the fundamental phthalocyanine nucleus.

The following examples in which parts are by weight unless otherwise indicated are illustrative of the instant invention and are not be regarded as limitative.

*Example I*

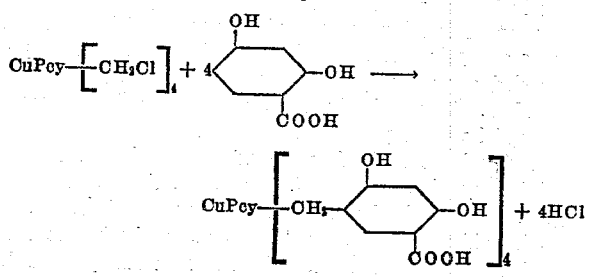

To a mixture of 31 g. of β-resorcylic acid, 200 ml. of dry nitrobenzene and 8 ml. of anhydrous stannic chloride were added 8 g. of copper tetrachloromethylphthalocyanine. The reaction mixture was mechanically stirred and heated slowly to 115° C. Then the heating period was continued at 115–120° C. for six hours. When cool, the crude product was isolated by diluting the reaction mixture with benzene, collecting the precipitated solid on a filter, washing first with benzene, then low boiling petroleum ether and finally water. It was purified by solution in 500 ml. of 2% sodium hydroxide, filtering, neutralizing the filtrate with hydrochloric acid, collecting the product on a filter, washing and drying to yield 14 g. of bluish-green solid. It is an alkali- and spirit-soluble dye possessing good lightfastness.

*Example II*

The procedure of Example I was repeated except that 8.5 g. of copper trichloromethylphthalocyanine were employed instead of the copper tetrachloromethylphthalocyanine. The reaction product was found to exhibit very similar properties. However, the shade was shifted slightly toward the blue.

*Example III*

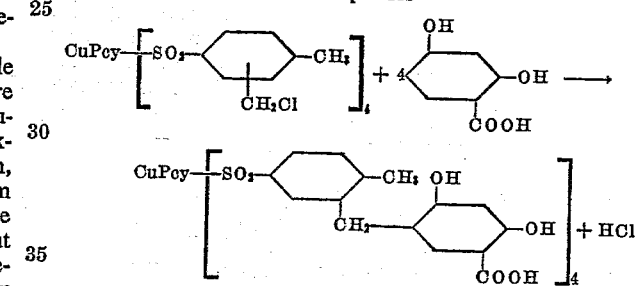

10 g. of copper tetra-(x-chloromethyl-4-tolylsulfonyl)-phthalocyanine (U. S. P. 2,542,328, Example 4) were added to a mixture of 28 g. of β-resorcylic acid, 200 ml. of dry nitrobenzene and 8 ml. of anhydrous stannic chloride. The reaction was carried out as in Example I. The product proved to be a greenish-blue, alkali- and spirit-soluble dyestuff.

*Example IV*

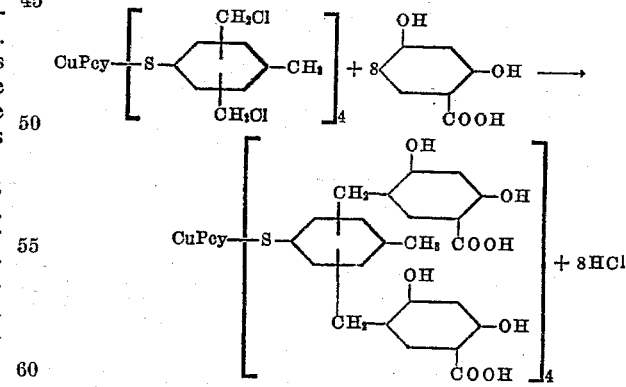

The process of Example III was repeated except that the phthalocyanine starting compound was substituted by 10 g. of copper tetra-(bis-x,x-chloromethyl-4-tolylmercapto)-phthalocyanine prepared by reaction of 8 moles of bischloromethyl ether with 1 mole of copper tetra-4-(p-tolylmercapto)-phthalocyanine (U. S. 2,456,274). The resulting greenish product was found to exhibit excellent spirit-, ketone- and alkali-solubility It is to be understood that equivalent amounts of chloromethylated phthalocyanine derivatives, in which the pendant aryl nuclei are attached to phenylene nuclei of the fundamental phthalocyanine nucleus through any of the divalent bridging links "D" described hereinabove other than the "—SO₂—" linkage of Example III and the "—S—" linkage of Example IV, may be substituted for the starting chloromethylated phthalocyanine derivatives of Examples III and IV in order to produce the corresponding products of the instant invention.

Various other modifications and variations of this invention will be obvious to a person skilled in the art and it is to be understood that such modifications and variations are to be included within the purview of this application and the spirit and scope of the appended claims.

We claim:

1. A compound of the formula

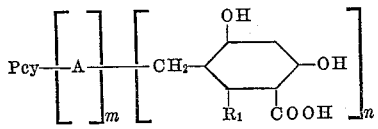

in which Pcy represents a fundamental phthalocyanine nucleus, A is a group of the formula:

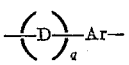

D is a divalent bridging link selected from the group consisting of —S—, —O—, —CO—, —SO$_2$—, —CH$_2$S—, —CH$_2$SO$_2$—, —CH$_2$O—, —CH$_2$CO—, —SO$_2$CH$_2$—, —SO$_2$NR—, —NRCO—, —NRSO$_2$— and —SO$_2$O— wherein R is a member of the group consisting of hydrogen and lower alkyl, $q$ has a value of 0 or 1, Ar represents a pendant aryl nucleus selected from the group consisting of benzene and naphthalene, $m$ has a value of 0 to 8, $R_1$ is selected from the group consisting of hydrogen, lower alkyl and lower alkoxy, and $n$ has a value of at least one.

2. A compound as defined in claim 1 containing a copper phthalocyanine nucleus.

3. A compound as defined in claim 2 in which $R_1$ is hydrogen.

4. A compound of the formula

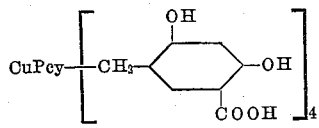

in which CuPcy is copper phthalocyanine.

5. A compound of the formula

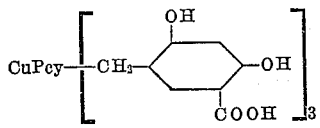

in which CuPcy is copper phthalocyanine.

6. A compound of the formula

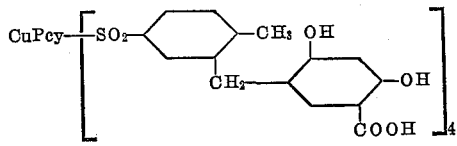

in which CuPcy is copper phthalocyanine.

7. A compound of the formula

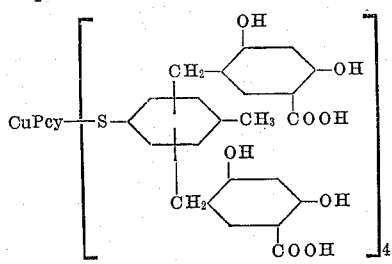

in which CuPcy is copper phthalocyanine.

8. A process comprising reacting by heating a compound of the formula

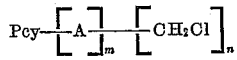

with $n$ molecular equivalents of a compound of the formula

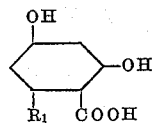

in which Pcy represents a fundamental phthalocyanine nucleus, A is a group of the formula:

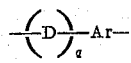

D is a divalent bridging link selected from the group consisting of —S—, —O—, —CO—, —SO$_2$—, —CH$_2$S—, —CH$_2$SO$_2$—, —CH$_2$O—, —CH$_2$CO—, —SO$_2$CH$_2$—, —SO$_2$NR—, —NRCO—, —NRSO$_2$— and —SO$_2$O— wherein R is a member of the group consisting of hydrogen and lower alkyl, $q$ has a value of 0 or 1, Ar represents a pendant aryl nucleus selected from the group consisting of benzene and naphthalene, $m$ has a value of 0 to 8, $R_1$ is selected from the group consisting of hydrogen, lower alkyl and lower alkoxy, and $n$ has a value of at least one.

9. A process as defined in claim 8 containing a copper phthalocyanine nucleus.

10. A process as defined in claim 9 in which $R_1$ is hydrogen.

References Cited in the file of this patent

UNITED STATES PATENTS

| | | |
|---|---|---|
| 2,124,299 | Holyzach et al. | July 19, 1938 |
| 2,435,307 | Haddock et al. | Feb. 3, 1948 |
| 2,604,476 | Jones | July 22, 1952 |
| 2,706,199 | Brentano | Apr. 12, 1955 |